(12) United States Patent
Azuma et al.

(10) Patent No.: US 7,971,902 B2
(45) Date of Patent: Jul. 5, 2011

(54) VEHICLE OCCUPANT RESTRAINT SYSTEM (75) Inventors: Seiji Azuma, Sagamihara (JP); Kouichi Oota, Yamato (JP); Hideaki Okamoto, Tokyo (JP)

(73) Assignees: Nissan Motor Co., Ltd., Yokohama-shi (JP); Takata Corporation, Tokyo (JP)

( * ) Notice: Subject to any disclaimer, the term of this patent is extended or adjusted under 35 U.S.C. 154(b) by 119 days.

(21) Appl. No.: 12/431,919

(22) Filed: Apr. 29, 2009

(65) Prior Publication Data
US 2009/0278339 A1 Nov. 12, 2009

(30) Foreign Application Priority Data

May 9, 2008 (JP) ................................. 2008-123406

(51) Int. Cl.
*B62D 21/18* (2006.01)
(52) U.S. Cl. ...................................................... 280/733
(58) Field of Classification Search ............... 280/728.1, 280/733, 736, 742, 801.1, 730.1; 180/268
See application file for complete search history.

(56) References Cited

U.S. PATENT DOCUMENTS

| 3,801,156 | A | * | 4/1974 | Granig | 280/733 |
| 3,841,654 | A | * | 10/1974 | Lewis | 280/733 |
| 3,865,398 | A | * | 2/1975 | Woll | 280/733 |
| 3,866,940 | A | * | 2/1975 | Lewis | 280/733 |
| 3,905,615 | A | | 9/1975 | Schulman | |
| 6,142,511 | A | * | 11/2000 | Lewis | 280/733 |
| 7,163,236 | B2 | * | 1/2007 | Masuda et al. | 280/733 |
| 7,413,220 | B2 | * | 8/2008 | Itoga et al. | 280/742 |
| 7,513,524 | B2 | * | 4/2009 | Oota et al. | 280/733 |
| 7,600,780 | B2 | * | 10/2009 | Tobata et al. | 280/733 |
| 7,665,761 | B1 | * | 2/2010 | Green et al. | 280/733 |
| 7,669,891 | B2 | * | 3/2010 | Azuma et al. | 280/733 |
| 2006/0028004 | A1 | * | 2/2006 | Oota et al. | 280/733 |
| 2006/0208471 | A1 | * | 9/2006 | Sundararajan et al. | 280/733 |
| 2006/0255573 | A1 | * | 11/2006 | Tobata et al. | 280/733 |
| 2007/0029767 | A1 | * | 2/2007 | Kokeguchi | 280/733 |
| 2007/0102910 | A1 | * | 5/2007 | Nezaki et al. | 280/733 |

FOREIGN PATENT DOCUMENTS

| EP | 1625980 A2 | 2/2006 |
| EP | 1669253 A2 | 6/2006 |
| JP | 2006-160062 A | 6/2006 |
| KR | 10-0276975 B1 | 10/1999 |

* cited by examiner

*Primary Examiner* — Eric Culbreth
*Assistant Examiner* — James English
(74) *Attorney, Agent, or Firm* — Foley & Lardner LLP (57) ABSTRACT

A vehicle occupant restraint system including: a seatbelt device including a shoulder belt portion restraining a part of a vehicle occupant from one of shoulders to a chest, and a lap belt portion restraining a waist of the vehicle occupant; an upper airbag provided in the shoulder belt portion, and configured to be deployed forward from the shoulder belt portion; a lower airbag provided in the lap belt portion, and configured to be deployed forward from the lap belt portion, the deployed upper and lower airbags coming into contact with each other in a vertical direction; and a movement restraining portion restraining relative movement of the deployed upper and lower airbags in a front-rear direction, extending downward from a lower side of the deployed upper airbag, and positioned in the rear of the deployed lower airbag.

11 Claims, 8 Drawing Sheets

VEHICLE OCCUPANT RESTRAINT SYSTEM

BACKGROUND OF THE INVENTION

1. Field of the Invention

The present invention relates to a vehicle occupant restraint system for protecting an occupant of a vehicle when the vehicle detects or predicts a collision.

2. Description of the Related Art

Japanese Patent Application Laid-Open Publication No. 2006-160062 discloses a vehicle occupant restraint system which has airbags installed inside a seatbelt and is configured to protect an occupant of a vehicle by deploying the airbags when a front collision of the vehicle occurs.

In the above system, an upper airbag and a lower airbag are respectively installed inside a shoulder belt portion and a lap belt portion which form the seatbelt. Additionally, when a collision of the vehicle occurs, the upper and lower airbags are prevented from being displaced from each other in a front-rear direction of the vehicle by individually deploying the upper and lower airbags so that a lower face of the upper airbag can come into contact with an upper face of the lower airbag.

SUMMARY OF THE INVENTION

In the above vehicle occupant restraint system, a frictional force generated by direct contact between the lower face of the upper airbag and the upper face of the lower airbag prevents the upper and lower airbags from being displaced from each other in the vehicle front-rear direction. However, in the cases where an inertial force acting on the vehicle occupant during breaking of the vehicle is large and where forces of deployment of the upper and lower airbags are large, the frictional force may be insufficient for reliably preventing the displacement.

The present invention was made in consideration of the above problem, and an object of the present invention is to provide a vehicle occupant restraint system capable of deploying an upper airbag and a lower airbag installed in a seatbelt while maintaining their proper relative positions in a front-rear direction of a vehicle.

An aspect of the present invention is a vehicle occupant restraint system including: a seatbelt device including a shoulder belt portion for restraining a part of a vehicle occupant from one of shoulders to a chest, and a lap belt portion for restraining a waist of the vehicle occupant; an upper airbag provided in the shoulder belt portion, and configured to be deployed forward from the shoulder belt portion when a collision of the vehicle is detected or predicted; a lower airbag provided in the lap belt portion, and configured to be deployed forward from the lap belt portion when a collision of the vehicle is detected or predicted, the deployed upper and lower airbags coming into contact with each other in a vertical direction; and a movement restraining portion for restraining relative movement of the deployed upper and lower airbags in a front-rear direction, the movement restraining portion extending downward from a lower side of the deployed upper airbag, and positioned in the rear of the deployed lower airbag.

BRIEF DESCRIPTION OF THE DRAWINGS

The invention will now be described with reference to the accompanying drawings wherein:

FIG. 6(a) shows a pressurized state inside the upper airbag when a fluid is supplied into the inside of the upper airbag. FIG. 6(b) shows a tensile force acting upon the first movement restraining portion due to the pressures inside the upper airbag which are shown in FIG. 6(a).

DESCRIPTION OF THE PREFERRED EMBODIMENT

Preferred embodiments of the present invention will be described below with reference to the accompanying drawings.

First Embodiment

Figure 1:
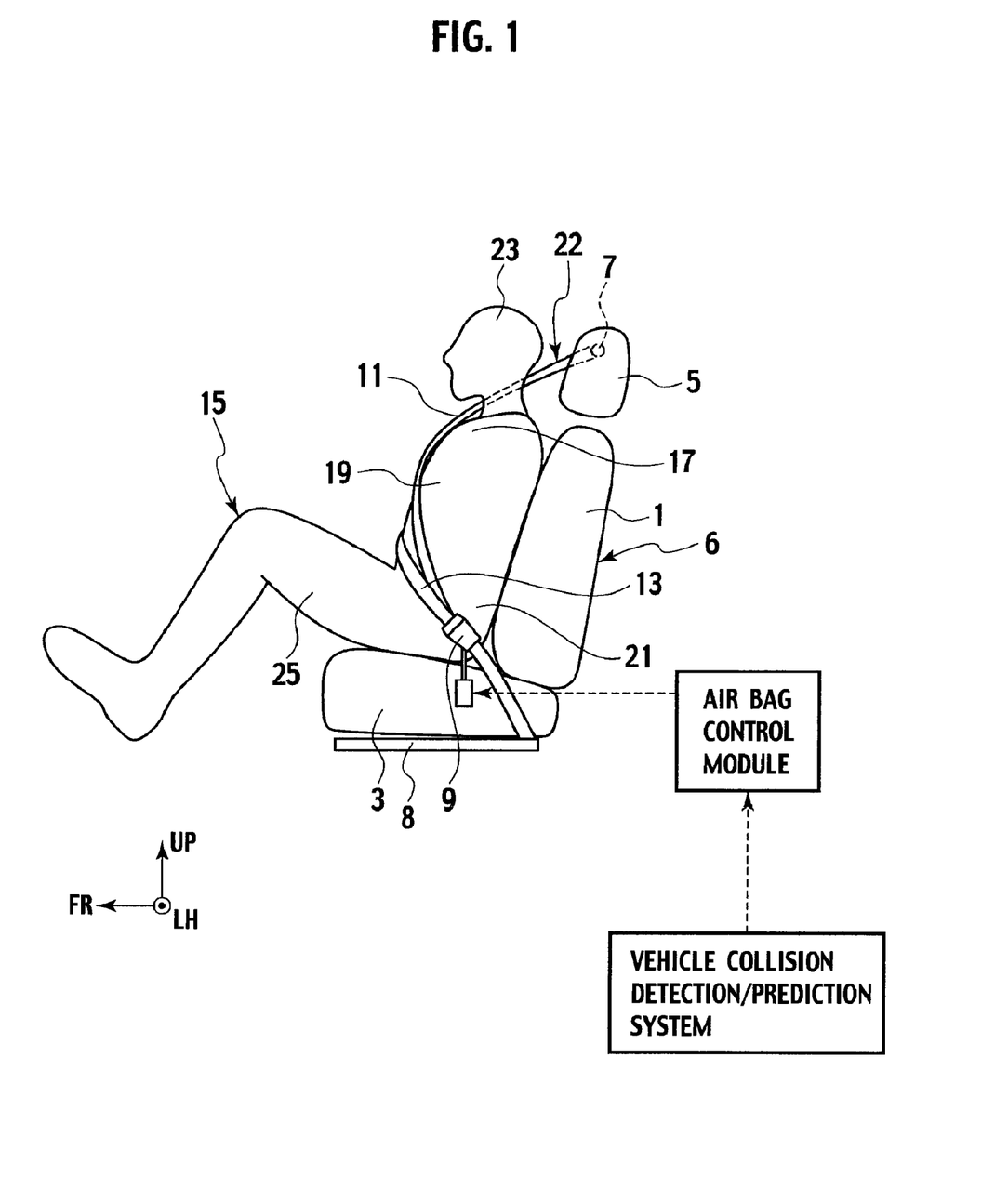
FIG. 1 is a side view of a vehicle occupant fastening a seatbelt device according to a first embodiment of the present invention.

A vehicle occupant restraint system according to a first embodiment of the present invention will be described with reference to FIG. 1. Note that, although a vehicle occupant restraint system arranged for a right-side rear seat of a vehicle will be described as an example in this embodiment, the system can be applied to seats in other positions.

Additionally, in the present invention, the upper airbag and the lower airbag are deployed when a vehicle collision detection/prediction system "detects" or "predicts" a collision of the vehicle. Here, the "detection" or "prediction" is not limited to a case where a collision load inputted to the vehicle is detected, but broadly includes, for example, such cases as where a running speed decrease of the vehicle is detected, where a situation that the vehicle is expected to come into contact with an obstacle is detected, and where a collision with an obstacle is predicted by external environment detection means formed by an ultrasonic sensor, a laser radar, a camera or the like.

A seatbelt device 22 in this embodiment is a three-point seatbelt device, and restraints a vehicle occupant 15 by using three points as supporting points, the three points being: a shoulder anchor portion 7 arranged in an upper position in the right side (the outer side in a width direction of the vehicle) of the vehicle occupant 15; an unillustrated lap anchor portion arranged in a lower position in the right side (the outer side in the vehicle width direction) of the vehicle occupant 15; and an unillustrated buckle anchor portion arranged in a lower position in the left side (the inner side in the vehicle width direction) of the vehicle occupant 15. These shoulder anchor portion 7, lap anchor portion and buckle anchor portion may be fixed to a vehicle body, or may be fixed to a vehicle seat 6.

The seatbelt device 22 is provided with a shoulder belt portion 11 and a lap belt portion 13. The shoulder belt portion 11 is provided to obliquely extend from the anchor portion 7 to a buckle portion 9, and restrains a part of the vehicle occupant 15 from a right shoulder 17 to a chest 19. The lap belt portion 13 is provided to extend from the lap anchor portion to the buckle portion 9, and restrains a waist 21 of the vehicle occupant 15. Note that, in FIG. 1, reference numerals 23 and 25 indicate a head and a femoral region of the vehicle occupant 15, respectively.

Figure 2:
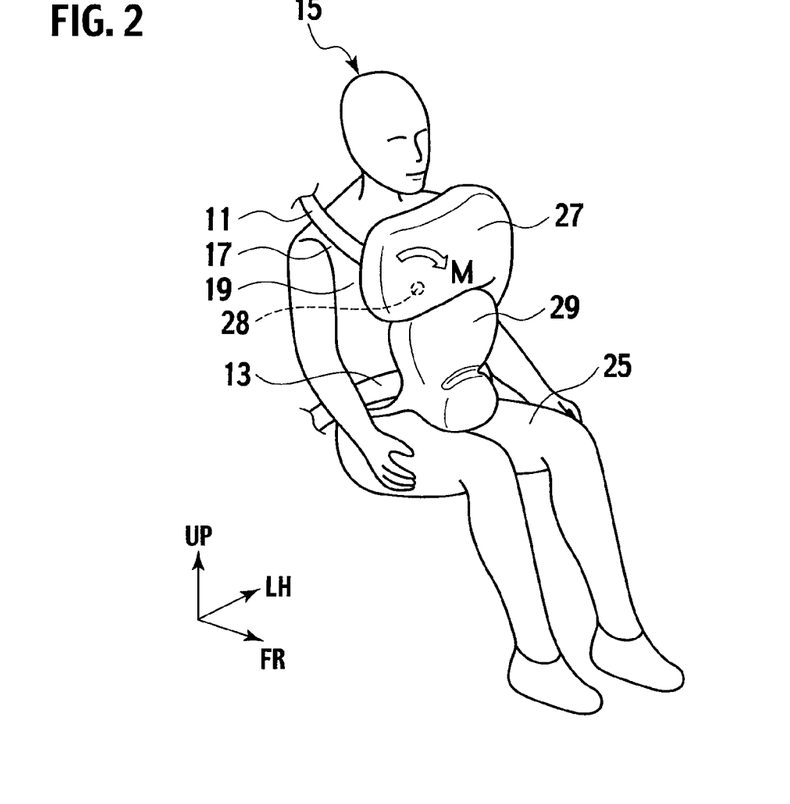
FIG. 2 is a perspective view showing a state where the upper airbag and the lower airbag according to the first embodiment of the present invention are deployed.

FIG. 2 is a perspective view showing a state where the upper airbag and the lower airbag according to the first embodiment of the present invention have been deployed.

When the vehicle collision detection/prediction system detects or predicts a collision of the vehicle, a command signal is transmitted from the vehicle collision detection/prediction system to an inflator via an airbag control module, and the inflator supplies a pressurized gas to the upper airbag 27 and the lower airbag 29. Thereby, as shown in FIG. 2, the upper airbag 27 and the lower airbag 29 are deployed forward of the shoulder belt portion 11 and the lap belt portion 13, respectively. That is, although being stored inside the shoulder belt portion 11 at normal times (when a collision of the vehicle has not yet been detected or predicted), the upper airbag 27 is deployed forward in the vehicle front-rear direction from the shoulder belt portion 11 when a collision of the vehicle is detected or predicted. Then, the upper airbag 27 positions itself, in a deployed/inflated state, in front of the shoulder belt portion 11 and in front of the chest 19 of the vehicle occupant 15 with a part of the upper airbag 27 being connected to the shoulder belt portion 11. Although being stored inside the lap belt portion 13 at the normal times, the lower airbag 29 is deployed forward in the vehicle front-rear direction from the lap belt portion 13 when a collision of the vehicle is detected or predicted. Then, the lower airbag 29 positions itself, in a deployed/inflated state, in front of the lap belt portion 13 and in front of an abdomen of the vehicle occupant 15 with a part of the lower airbag 29 being connected to the lap belt portion 13. The deployed upper airbag 27 and the deployed lower airbag 29 vertically come into contact with each other. That is, the deployed upper airbag 27 is positioned upward of the lower airbag 29, and has a lower part thereof making direct contact with an upper part of the lower airbag 29.

Note that, when a braking force acts on the vehicle after a collision of the vehicle is detected or predicted, an inertial force forcing the vehicle occupant 15 to move forward in the vehicle front-rear direction relative to a vehicle body (the seat 6) acts on the vehicle occupant 15. At this time, an upper body of the vehicle occupant 15 turns forward about the neighborhood of the waist 21 restrained by the lap belt portion 13, and a shoulder 17 of the shoulders 17, which is located in the buckle portion 9 side where the shoulder 17 is not restrained by the shoulder belt portion 11, moves forward and downward of the vehicle due to the inertial force. Thereby, a rotational moment M about a fixing portion 28, through which the upper airbag is fixed to the shoulder belt portion 11, is applied to the upper airbag 27 as shown in FIG. 2, for example, in the clockwise direction from an anterior view if the vehicle occupant 15 is on the right-side seat, or in the anticlockwise direction from an anterior view if the vehicle occupant 15 is on the left-side seat.

Figure 3:
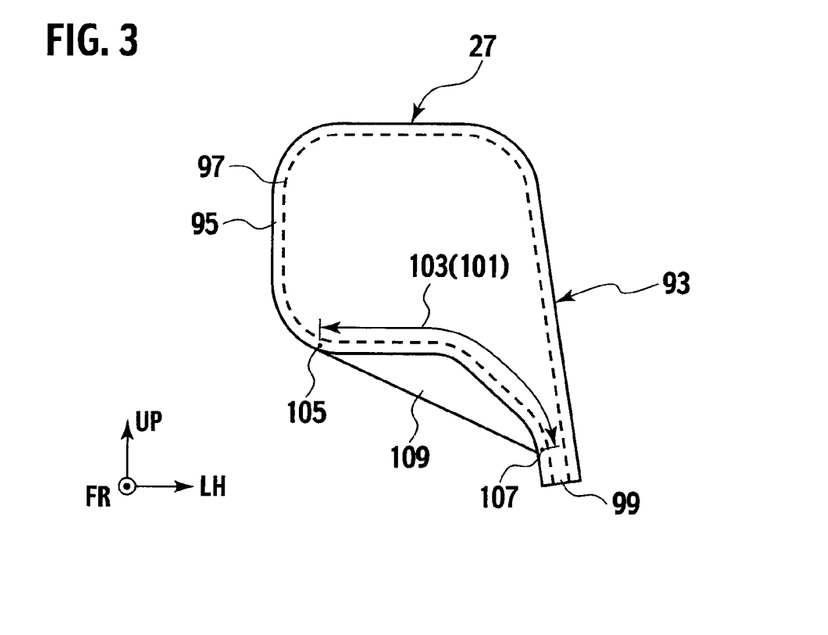
FIG. 3 is a front view of the upper airbag according to the first embodiment of the present invention, which is yet to be deployed and is provided with a first movement restraining portion.

FIG. 3 is a front view of the upper airbag according to the first embodiment of the present invention, which is yet to be deployed and is provided with a first movement restraining portion.

The upper airbag 27 is formed into a bag by sewing together marginal portions 95 of two sheet materials along a sewing line 97 substantially rectangular in a plan view, and has a pressurized gas inflow port 99 provided to a bottom end portion thereof.

In a lower portion of the upper airbag 27, a concaved section 103 (a concave portion 101) is formed where the sewing line 97 is formed into a substantially V-shaped curve curved inward (toward the upper right side in FIG. 3) with respect to the upper airbag 27 in a plan view. In the lower portion of the upper airbag 27, there is further provided the first movement restraining portion 109 linearly joining end portions 105 and 107 which are both ends of the concaved section 103 in the vehicle width direction. That is, in the concaved section 103, the deployed upper airbag 27 has an outer surface having a shape concaved inwardly. Here, the end portion 105 is, out of the end portions of the concaved section 103 having the outer surface concaved inwardly, an end portion in one side corresponding to where the anchor portion 7 of the shoulder belt portion 11 is arranged (that is, out of the left and right shoulders 17 of the vehicle occupant 15, the side corresponding to a shoulder restrained by the shoulder belt portion 11). On the other hand, the end portion 107 is, out of the end portions of the concaved section 13, an end portion in one side corresponding to where the buckle portion 9 of the shoulder belt portion 11 is arranged (that is, out of the left and right shoulders 17 of the vehicle occupant 15, the side corresponding to a shoulder unrestrained by the shoulder belt portion 11).

The first movement restraining portion 109 specifically is a substantially triangular remainder of at least any one of the two sheet materials when the sheet materials are cut. In this embodiment, the front-side sheet material is cut out, and a part of the back-side sheet material is kept remaining in a substantially triangle shape. The first movement restraining portion 109 is provided so as to, in a lower side of the deployed upper airbag 27, linearly join the end portion in one side corresponding to where the anchor portion 7 (refer to FIG. 1) is arranged and the end portion in the other side corresponding to where the buckle portion 9 (refer to FIG. 1) is arranged. The upper airbag 27 is thus integrally formed of: an upper airbag main body portion 93; and the first movement restraining portion 109 provided along the vehicle width direction to a lower side portion of the upper airbag main body portion 93. Note that, when a pressurized fluid is supplied into the inside of the upper airbag main body portion 93 through the inflow port 99, the upper airbag main body portion 93 inflates and is deployed.

Figure 4:
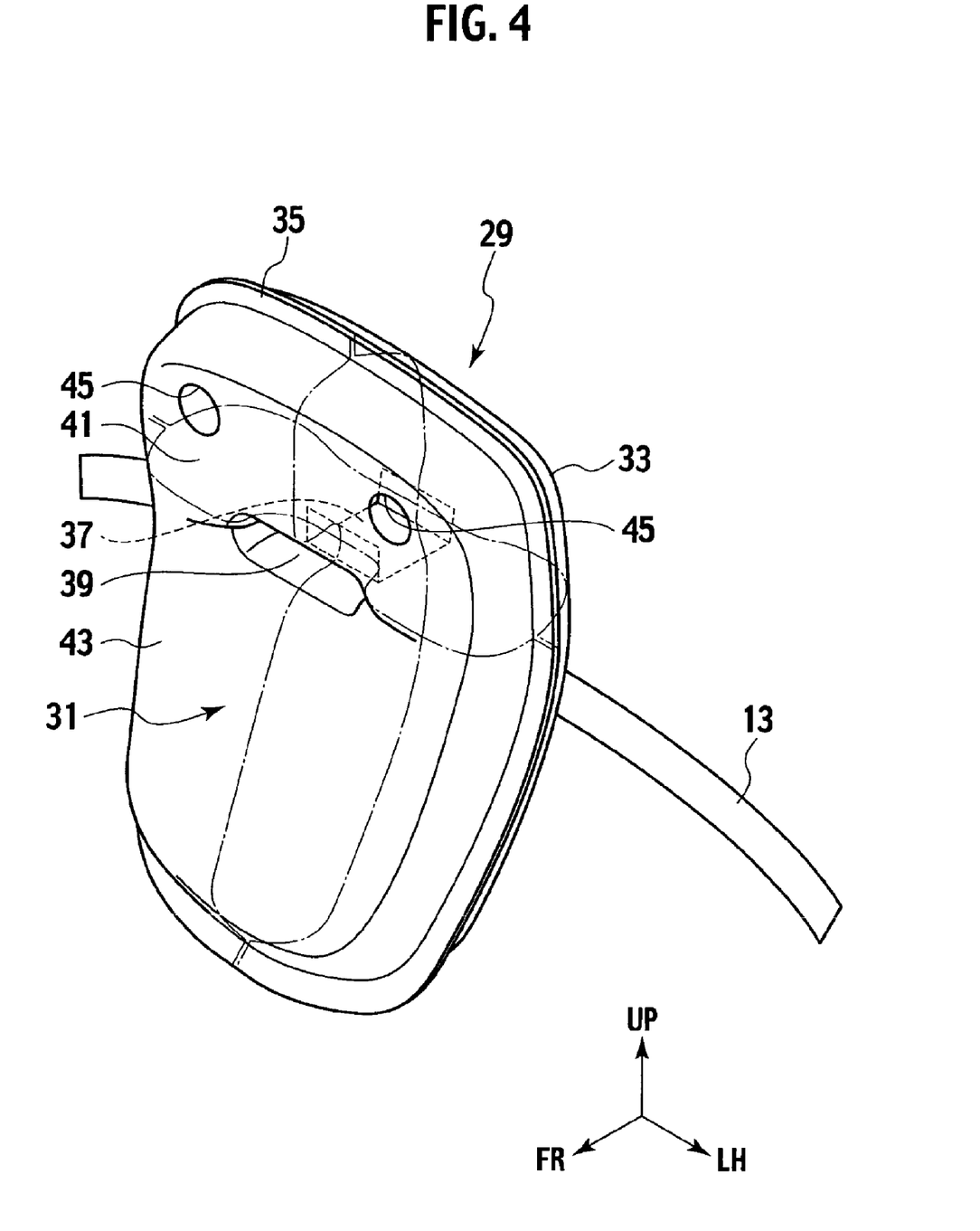
FIG. 4 is a perspective view of the lower airbag according to the present invention.

The lower airbag 29 is formed, as shown in FIG. 4, by lapping a front-side sheet material 31 over a back-side sheet material 33, and joining marginal portions 35 of these sheet materials to each other through sewing or the like. In an upper portion of the front-side sheet material 31, a pair of left and right round discharging holes 45 are formed.

Additionally, a part of an inner face of the front-side sheet material 31 and a part of an inner face of the back-side sheet material 33 are joined to each other in a front-rear direction by means of an deployment regulating member 37 formed into a sheet. The deployment regulating member 37 is thus arranged inside the lower airbag 29, and sections in the front-side sheet material 31 and the back-side sheet material 33 are pulled inward with respect to the lower airbag 29 and in a direction substantially parallel to the front-rear direction, the sections having the deployment regulating member 37 fixed thereto. Consequently, in the front-rear direction, a thickness of the lower airbag 29 at a portion where the deployment regulating member 37 is fixed is smaller than those of the other portions, and a hollow 39 is formed on an outer surface of the lower airbag 29.

The deployment regulating member 37 thus regulates deployment of the lower airbag 29 in the front-rear direction when the lower airbag 29 is deployed. A section in the lower airbag 29 which is upper than the deployment regulating member 37 will be referred to as an upper section 41, and a section in the lower airbag 29 which is lower than the deployment regulating member 37 will be referred to as a lower section 43. As has been described above, in the front-rear direction, a thickness of the lower airbag 29 at the portion where the deployment regulating member 37 is fixed is smaller than those of the other portions. Consequently, the deployed lower airbag 29 becomes more likely to bend about the portion where the deployment regulating member 37 is fixed, and the upper section 41 becomes moveable in a front-rear direction relatively freely as compared to the lower section 43.

Figure 5:
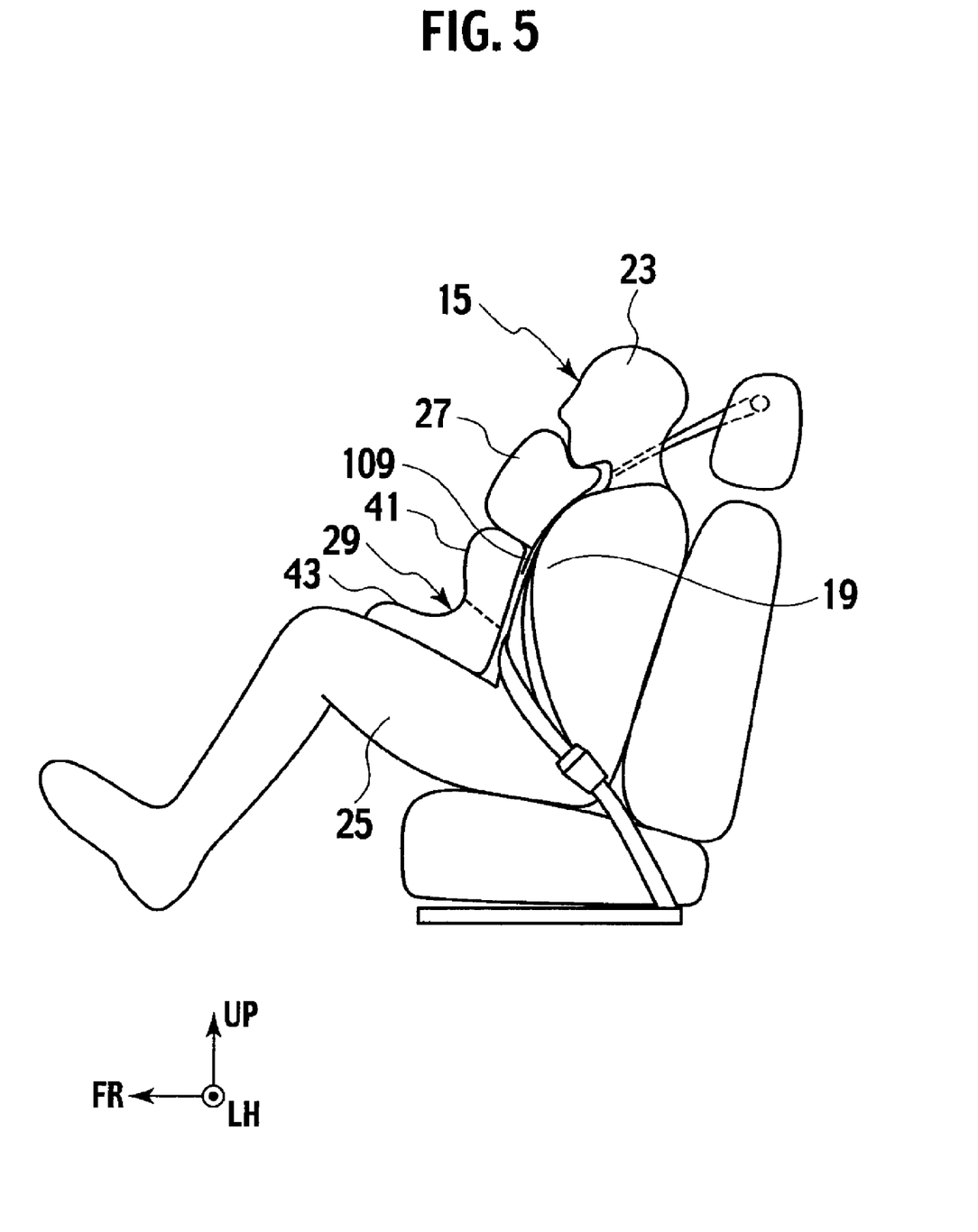
FIG. 5 is a side view of a state where the upper airbag and the lower airbag according to the first embodiment of the present invention are deployed.

FIG. 5 is a side view of a state where the upper airbag and the lower airbag according to the first embodiment of the present invention are deployed.

When the upper airbag 27 including the first movement restraining portion 109 and the lower airbag 29 are deployed, the first movement restraining portion 109 extends downward from the lower side of the upper airbag 27, and is positioned, with respect to the vehicle, in the rear of the upper section 41 of the deployed lower airbag 29 (that is, between the upper section 41 of the lower airbag 29 and the vehicle occupant 15), as shown in FIG. 5. Thus, the first movement restraining portion 109 serves as a non-deploying portion in the upper airbag 27.

Figure 6:
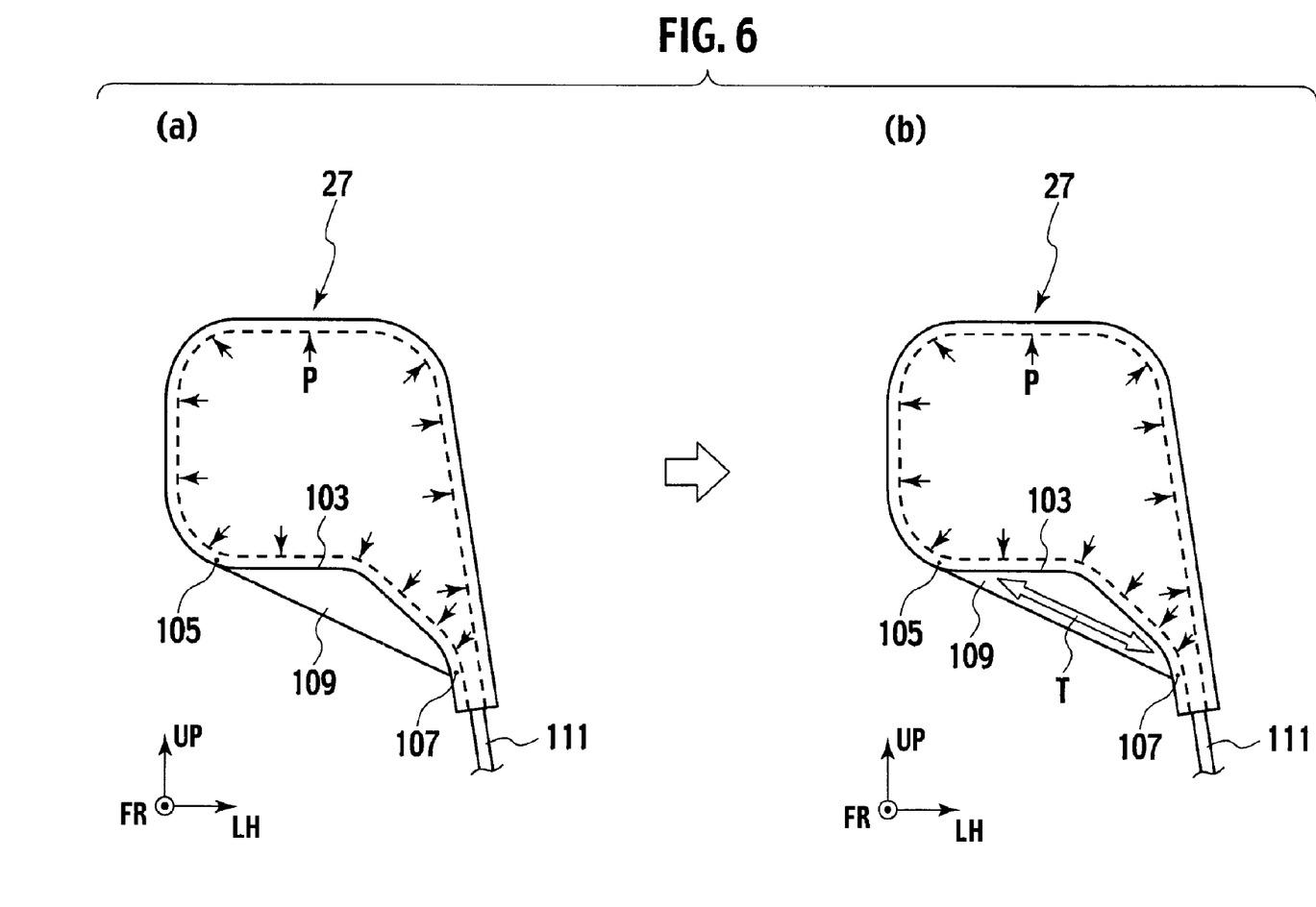
FIG. 6 is schematic views explaining a tensile force acting on the upper airbag according to the first embodiment of the present invention.

FIG. 6 is schematic views explaining a tensile force acting on the upper airbag according to the first embodiment of the present invention. FIG. 6(a) shows a pressurized state inside the upper airbag when a fluid is flown into the inside of the upper airbag, and FIG. 6(b) shows a tensile force acting on the first movement restraining portion due to the pressures inside the upper airbag.

A supply pipe 111 connected to the inflator is fit to the inflow port 99 formed in the bottom end portion of the upper airbag 27. The upper airbag 27 is deployed when a pressurized fluid is supplied from the inflator into the inside of the upper airbag 27 via the supply pipe 111. A pressure P uniformly acts on each of sections in the inner surface of the deployed upper airbag 27. Here, as has been described above, the concaved section 103 (the concave portion 101) is provided in the upper airbag 27 where the upper airbag 27 has an outer surface concaved inwardly when deployed. Additionally, the pressure P acts on the concaved section 103 in a manner pushing the concaved section 103 in an outward direction with respect the upper airbag 27, whereby the end portions 105 and 107 of the concaved section 103 are forced to be more distant from each other. Thereby, a tensile force T along an arrow in FIG. 6(b) acts on the first movement restraining portion 109.

Next, functions and effects produced by the first embodiment of the present invention will be described.

In this embodiment, the first movement restraining portion 109 is provided which extends downward from the lower side of the deployed upper airbag 27, is positioned in the rear, in the vehicle front-rear direction, of the deployed lower airbag 29, and, when the deployed upper airbag 27 and the deployed lower airbag 29 comes into contact with each other, restrains relative movement between the airbags 27 and 29 in the front-rear direction.

Consequently, when the upper airbag 27 and the lower airbag 29 are deployed and come into contact with each other after a collision of the vehicle is detected or predicted, relative movement between the upper airbag 27 and the lower airbag 29 in the front-rear direction can be restrained. Thereby, in a case where the vehicle occupant 15 moves forward due to an inertial force when breaking the vehicle, the upper airbag 27 and the lower airbag 29 can reliably protect a head 23 and the like of the vehicle occupant 15. Additionally, it is prevented that the upper section 41 of the deployed lower airbag 29 intrudes into the rear of the deployed upper airbag 27, and thereby the proper transmission of a supporting force of the lower airbag 29 to the vehicle occupant 15 is secured. Additionally, even when the deployed upper airbag 27 is forced to move forward of the lower airbag 29 due to a load inputted from the vehicle occupant 15, the movement of the upper airbag 27 is prevented by having the first movement restraining portion 109 abutting to the upper section 41 of the lower airbag 29. Thereby, relative positions of the upper airbag 27 and the lower airbag 29 in the vehicle front-rear direction can be properly maintained when the upper airbag 27 and the lower airbag 29 are deployed.

As a result, the head 23 of the vehicle occupant 15 can be more quickly restrained in a manner allowing the head 23 of the vehicle occupant 15 bending forward to be received by the upper and lower airbags 27 and 29, and thereby allowing a load thereof to be supported by the femoral regions 25 of the vehicle occupant 15 or a seating face of a seat cushion 3 through the upper and lower airbags 27 and 29.

Additionally, the shoulder belt portion 11 is provided to extend, from the anchor portion arranged in one of the left and right sides of the sitting vehicle occupant 15 near the level of the corresponding left and right shoulders 17 thereof, to the buckle portion 9 arranged in the other side, and the first movement restraining portion 109 is provided to, in the lower side of the deployed upper airbag 27, join the end portion in the side corresponding to where the anchor portion 7 is arranged and the end portion in the side corresponding to where the buckle portion 9 is arranged.

Consequently, when the upper airbag 27 is deployed, the tensile force T occurs on the first movement restraining portion 109 located between the end portion in the side corresponding to where the anchor portion 7 is arranged and the end portion in the side where the buckle portion 9 is arranged. By the first movement restraining portion 109 made tense by this tensile force T, intrusion of the upper section 41 of the lower airbag 29 into the rear of the upper airbag 27 can be prevented. This provides a reliable guide for the upper section 41 of the lower airbag 29 by which the lower airbag 29 is securely bent and the upper section 41 thereof securely falls forward in the vehicle front-rear direction.

Additionally, when a braking force acts on the vehicle after a collision of the vehicle is detected or predicted, an inertial force forcing the vehicle occupant 15 to move forward in the vehicle front-rear direction relative to the vehicle body (the seat 6) acts on the vehicle occupant 15. At this time, the upper body of the vehicle occupant 15 turns forward about the neighborhood of the waist 21 restrained by the lap belt portion 13, and the shoulder 17 of the shoulders 17, which is located in the buckle portion 9 side and is not restrained by the shoulder belt portion 11, moves forward and downward due to the inertial force. Thereby, the rotational moment M about the fixing potion 28, through which the upper airbag is fixed to the shoulder belt portion 11, is applied to the upper airbag 27 as shown in FIG. 2, for example, in the clockwise direction from an anterior view if the vehicle occupant 15 is on the right-side seat, or in the anticlockwise direction from an anterior view if the vehicle occupant 15 is on the left-side seat. By this rotational moment also, the tensile force T is applied on the first movement restraining portion 109 of the upper airbag 27. By having the first movement restraining portion 109, on which the tensile force T has been applied, abutting to the upper section 41 of the lower airbag 29, the upper airbag 27 is prevented from moving forward relative to the lower airbag 29, whereby relative positions of the upper airbag 27 and the lower airbag 29 in the front-rear direction can be maintained properly.

Additionally, the concave portion 101 where the upper airbag 27 has the outer surface concaved inwardly when deployed is provided in the above upper airbag 27, and the first movement restraining portion 109 joins the end portions 105 and 107 of the concave portion 101 in the vehicle width direction.

Consequently, when a pressurized fluid 63 is supplied into the inside of the upper airbag 27, a pressure of the fluid 63 uniformly acts on an entirety of the inner surface of the upper airbag 27, and pushes the concave portion 101 outward, whereby the tensile force T forcing the concave portion 101 to be tense acts on the first movement restraining portion 109. Thereby, the tensile force T is additionally applied on the first movement restraining portion 109.

Furthermore, the first movement restraining portion 109 is provided as a non-deploying portion in the upper airbag 27. Consequently, when the upper airbag 27 and the lower airbag 29 are deployed, the lower airbag 29 and the first movement restraining portion 109 of the upper airbag 27 are positioned in a state overlapping each other in the vehicle front-rear direction. On the other hand, if the first movement restraining portion 109 is provided as a deploying portion, the lower airbag 29 and the first movement restraining portion 109 of the upper airbag 27 are deployed at the same time in a overlapping region, which leads to a risk that an excessive force of deployment may be applied to the vehicle occupant 15. Consequently, by setting a non-deploying portion in the upper airbag 27 as the first movement restraining portion 109, a force of deployment applied on the vehicle occupant 15 can be controlled.

Note that: the upper airbag 27 is formed by joining together the marginal portions 95 of the two sheet materials; the concave portion 101 is the concaved section 103 obtained by arranging the joined portions inward with respect to the upper airbag 27; and the first movement restraining portion 109 is formed of a part of the sheet materials which is arranged in the concaved section 103.

Consequently, production work of the first movement restraining portion 109 can be made simple since the first movement restraining portion 109 can be produced only by having a part of the marginal portions 95 not cut out, but left as it is.

Second Embodiment

Next, a vehicle occupant restraint system according to a second embodiment of the present invention will be described. The same reference numerals are attached to the same sections as those of the above described first embodiment, and description thereof will be omitted.

Figure 7:
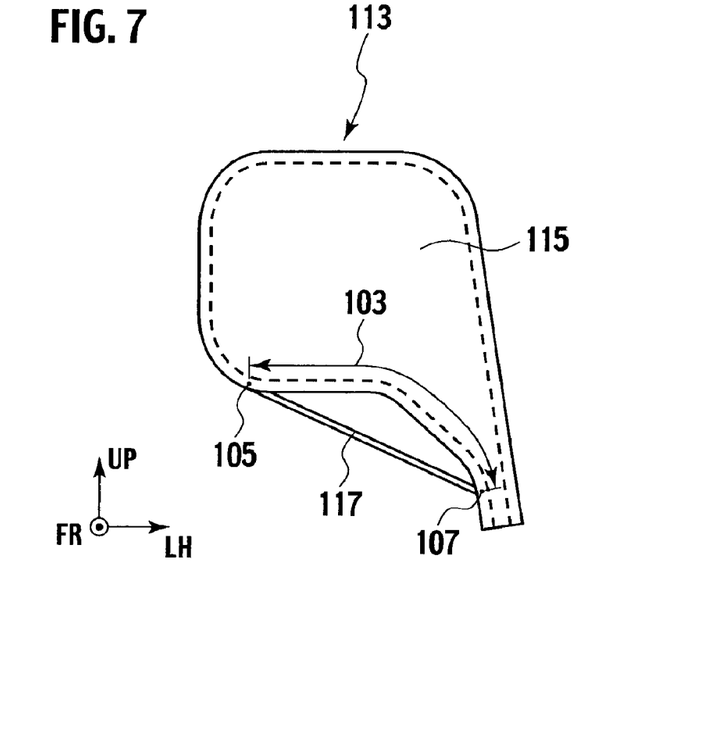
FIG. 7 is a front view of an upper airbag according to a second embodiment of the present invention, which is yet to be deployed and provided with a second movement restraining portion.

FIG. 7 is a front view of an upper airbag according to the second embodiment of the present invention, which is provided with a second movement restraining portion.

This upper airbag 113 is formed of an upper airbag main body portion 115, and the second movement restraining portion 117 which is a linear member joining the end portions 105 and 107 of the concaved section 103 of the upper airbag main body portion 115. To the second movement restraining portion 117, any one of various linear members can be applied as long as the one is an inelastic string, strip, and the like. Additionally, both ends of the second movement restraining portion 117 can be fixed to the upper airbag main body portion 115 through sewing or the like.

Next, functions and effects produced by the second embodiment of the present invention will be described.

In this embodiment, the second movement restraining portion 117 is formed of a linear member, whereby a length of the second movement restraining portion 117 can be easily changed.

Third Embodiment

Next, a vehicle occupant restraint system according to a third embodiment of the present invention will be described. The same reference numerals are attached to the same sections as those of the above described first and second embodiments, and description thereof will be omitted.

Figure 8:
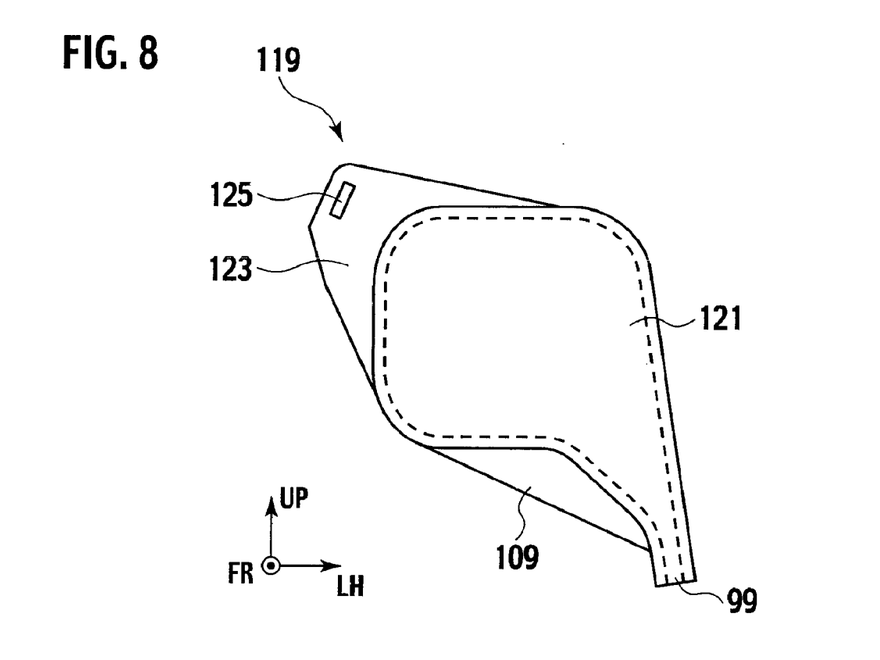
FIG. 8 is a front view showing an upper airbag according to a third embodiment of the present invention, which is yet to be deployed.
Figure 9:
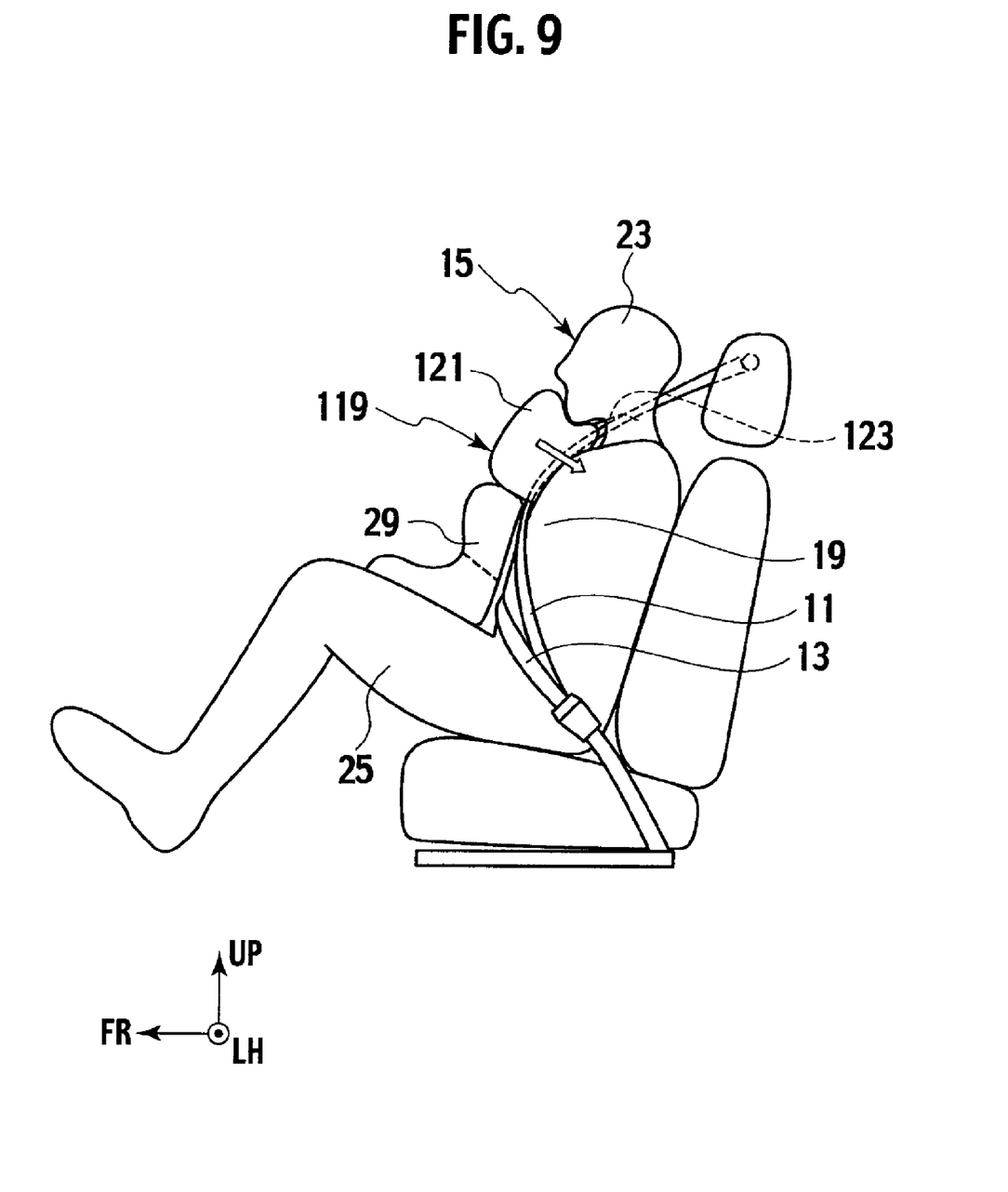
FIG. 9 is a side view of a state where the upper airbag shown in FIG. 8 and a lower airbag are deployed.

FIG. 8 is a front view showing an upper airbag according to a third embodiment of the present invention, which is yet to be deployed, and FIG. 9 is a side view of a state where the upper airbag shown in FIG. 8 and a lower airbag are deployed. As shown in FIG. 8, the upper airbag 119 is integrally formed of: an upper airbag main body portion 121; the first movement restraining portion 109 provided to a lower side of the upper airbag main body portion 121; and an extended portion 123 provided on top of the upper airbag main body portion 121.

The extended portion 123 is a substantially trapezoidal remainder of at least any one of two front-side and back-side sheet materials forming the upper airbag main body portion 121 when the sheet materials are cut. In an upper end portion thereof, an insertion hole 125 is formed through which the shoulder belt portion 11 (webbing) is inserted. The insertion hole 125 is formed into a size which allows the upper airbag 119 to move with respect to the shoulder belt portion 11 with the shoulder belt portion 11 being inserted therethrough. Thus, in this embodiment, an upper end of the deployed upper airbag 119 is movably supported by the shoulder belt portion 11. Next, functions and effects produced by the third embodiment of the present invention will be described.

In this embodiment, the upper end of the deployed upper airbag 119 is movably supported by the shoulder belt portion 11. Consequently, as shown in FIG. 9, when the upper airbag 119 and the lower airbag 29 are deployed, an upper portion of the upper airbag main body portion 121, which is forced by the deployment to be more distant from the vehicle occupant 15, is pulled rearward (toward the vehicle occupant 15) in an arrowed direction by the extended portion 123 through which the shoulder belt portion 11 (webbing) is inserted (the closeness between the upper airbag 27 and the shoulder belt portion 11 is maintained). Thereby, the upper airbag 119 is prevented from moving forward and thereby moving apart from the chest 19 of the vehicle occupant 15.

Next, operations of each of the vehicle occupant restraint systems according to the first to third embodiments of the present invention will be described.

Figure 10:
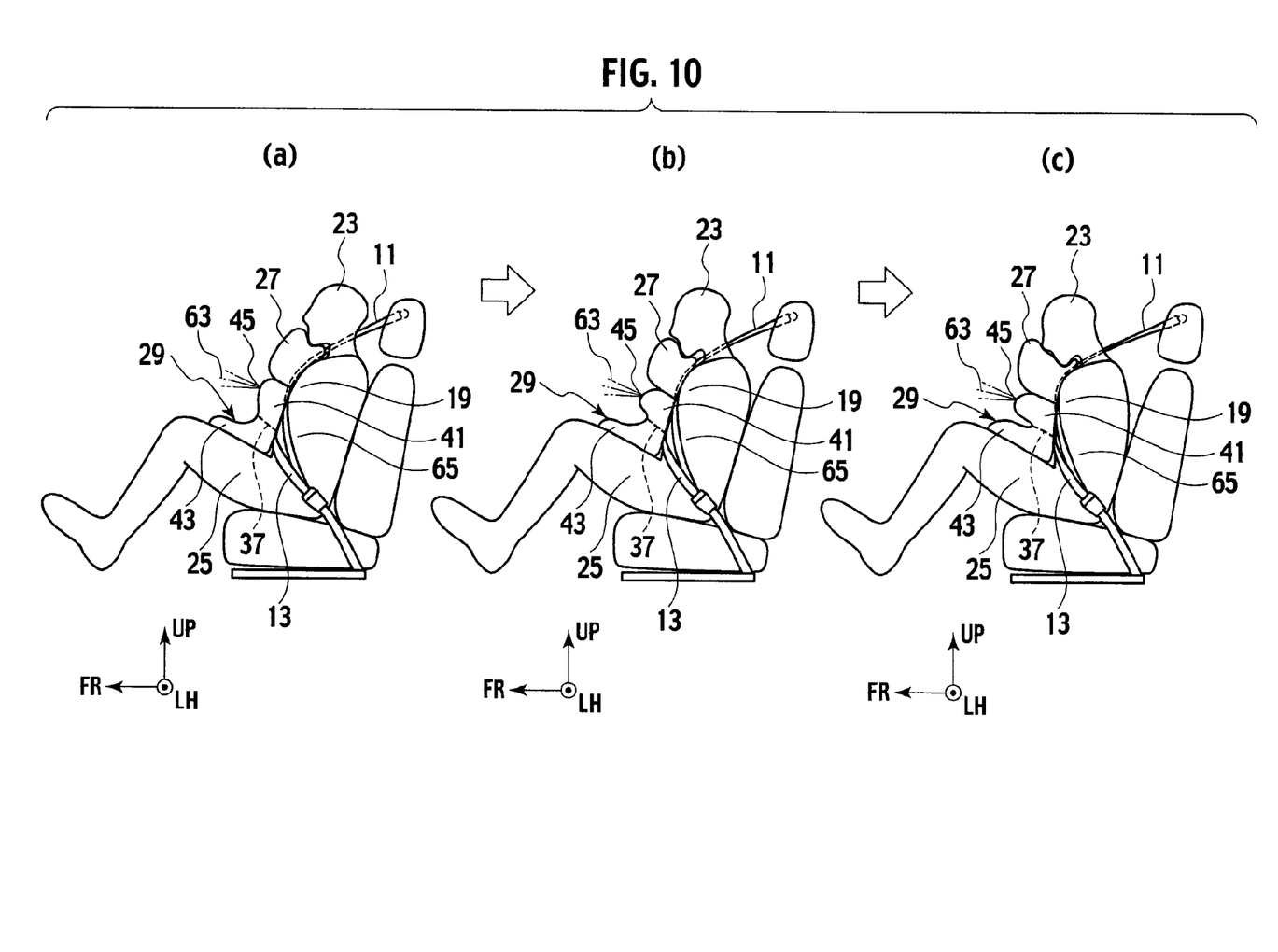
FIG. 10 is side views showing operations of vehicle occupant restraint systems according to the first to third embodiments of the present invention, and FIGS. 10(a), (b) and (c) show an initial stage immediately following detection or prediction of a vehicle collision, an intermediate stage following the initial stage, and a late stage, where a lower airbag bends, following the intermediate stage, respectively.

FIG. 10 is side views showing the operations of vehicle occupant restraint systems according to the first to third embodiments of the present invention, and FIGS. 10(a), (b) and (c) show an initial stage immediately following detection or prediction of a vehicle collision, an intermediate stage following the initial stage, and a late stage, where the lower airbag bends, following the intermediate stage, respectively.

As shown in FIG. 10(a), once the vehicle collision is detected or predicted, the upper airbag 27 is deployed forward in the vehicle front-rear direction from the shoulder belt portion 11, and the lower airbag 29 is deployed forward in the vehicle front-rear direction from the lap belt portion 13. Here, the lower airbag 29 is deployed upward from the lap belt portion 13 also, whereby an upper face of the lower airbag 29 makes a direct contact with a lower face of the upper airbag 27. Since the discharging holes 45 are formed in a front face of the lower airbag 29, a pressurized fluid (for example, a pressurized gas) inside the lower airbag 29 is discharged forward in the vehicle front-rear direction from these discharging holes 45.

Thereafter, as shown in FIGS. 10(b) and 10(c), due to the inertial force acting on the vehicle occupant 15, the upper body of the vehicle occupant 15 turns forward about the neighborhood of the waist 21, and the head 23 moves forward and downward. However, a load thereof is received by the deployed upper airbag 27, and the deployed lower airbag 29 which supports the upper airbag 27, and forward movement thereof is restrained. At this time, the lower airbag 29 is pressed downward by the upper airbag 27 while being pressed upward by the femoral regions 25. However, since the deployment regulating member 37 is arranged in the lower airbag 29, the upper section 41 thereof bends about the deployment regulating member 37 with respect to the lower section 43 thereof in a manner falling down forward in the vehicle front-rear direction. The fluid 63 is discharged forward so that the discharging holes 45 can be prevented from becoming narrow even when the lower airbag 29 bends.

The preferred embodiments described herein are illustrative and not restrictive, and the invention may be practiced or embodied in other ways without departing from the spirit or essential character thereof. Appropriate combinations of the above described embodiments, and modifications and changes belonging to the technical scope of the present invention, are all included in the scope of the present invention.

The present disclosure relates to subject matters contained in Japanese Patent Application No. 2008-123406, filed on May 9, 2008, the disclosures of which is expressly incorporated herein by reference in its entirety.

What is claimed is:

1. A vehicle occupant restraint system comprising:
   a seatbelt device comprising a shoulder belt portion for restraining a part of a vehicle occupant from a shoulder of the vehicle occupant to a chest of the vehicle occupant, and a lap belt portion for restraining a waist of the vehicle occupant;
   an upper airbag provided in the shoulder belt portion and configured to be deployed forward from the shoulder belt portion when a collision of the vehicle is detected or predicted;
   a lower airbag provided in the lap belt portion and configured to be deployed forward from the lap belt portion when the collision of the vehicle is detected or predicted, the deployed upper and lower airbags coming into contact with each other in a vertical direction; and
   a movement restraining portion for restraining relative movement of the deployed upper and lower airbags in a front-rear direction, the movement restraining portion extending downward from a lower side of the deployed upper airbag, and abutting a rear of the deployed lower airbag.

2. The vehicle occupant restraint system according to claim wherein:
   the shoulder belt portion extends from an anchor portion to a buckle portion, the anchor portion arranged on one of right and left sides of the seated vehicle occupant near a level of the shoulders, the buckle portion arranged on the other side of the vehicle occupant, and
   the movement restraining portion joins a part of the lower side of the upper airbag on the side where the anchor portion is arranged, to a part of the lower side of the upper airbag on the side where the buckle portion is arranged.

3. The vehicle occupant restraint system according to claim 1, wherein:
   the deployed upper airbag has a concave portion where an outer surface of the upper airbag is concaved inwardly, and
   the movement restraining portion extends in a width direction of the vehicle and joins both ends of the concave portion in the width direction.

4. The vehicle occupant restraint system according to claim 1, wherein the movement restraining portion is a non-deploying portion of the upper airbag.

5. The vehicle occupant restraint system according to claim 3, wherein:
   the upper airbag is formed by joining together marginal portions of two sheet materials,
   the concave portion is formed of a concaved section where the joined portions of the two sheet materials are arranged so as to curve inward, and
   the movement restraining portion is formed of a part of the sheet materials arranged in the concaved section.

6. The vehicle occupant restraint system according to claim 1, wherein an upper end of the deployed upper airbag is movably supported by the shoulder belt portion.

7. A vehicle occupant restraint system comprising:
   a seatbelt device including a shoulder belt portion for restraining a part of a vehicle occupant from a shoulder of the vehicle occupant to a chest of the vehicle occupant, and a lap belt portion for restraining a waist of the vehicle occupant;
   an upper airbag provided in the shoulder belt portion and configured to be deployed forward from the shoulder belt portion when a collision of the vehicle is detected or predicted;
   a lower airbag provided in the lap belt portion and configured to be deployed forward from the lap belt portion when the collision of the vehicle is detected or predicted, the deployed upper and lower airbags coming into contact with each other in a vertical direction; and
   a movement restraining means for restraining relative movement of the deployed upper and lower airbags in a front-rear direction, the movement restraining means extending downward from a lower side of the deployed upper airbag, and abutting a rear of the deployed lower airbag.

8. The vehicle occupant restraint system according to claim 1, wherein the movement restraining portion that extends downward from the lower side of the deployed upper airbag is positioned between an upper section of the deployed lower airbag and the vehicle occupant.

9. The vehicle occupant restraint system according to claim 1, wherein a tensile force acts on the movement restraining portion of the deployed upper airbag.

10. The vehicle occupant restraint system according to claim 2, wherein the movement restraining portion comprises a linear member joining a part of the lower side of the upper airbag on the side where the anchor portion is arranged to a part of the lower side of the upper airbag on the side where the buckle portion is arranged.

11. The vehicle occupant restraint system according to claim 5, wherein the part of the sheet materials arranged in the concaved section is formed to have a substantially triangular shape.

* * * * *